United States Patent Office 3,733,302
Patented May 15, 1973

3,733,302
TRIMELLITIMIDO ALKYL SUBSTITUTED AROMATIC CARBOCYCLIC ORGANIC POLYMERS AND A METHOD FOR MAKING SAME
Johann F. Klebe, Henry A. Wroblewski, and Alfred R. Gilbert, Schenectady, N.Y., assignors to General Electric Company
No Drawing. Filed Sept. 1, 1971, Ser. No. 177,176
Int. Cl. C08g 23/20
U.S. Cl. 260—47 ET       2 Claims

ABSTRACT OF THE DISCLOSURE

A variety of aromatic carbocyclic polymers substituted with trimellitimido alkyl radicals can be made by effecting reaction between an aromatic carbocyclic organic polymer, for example, polyphenylene oxide, and a hydroxy alkyl trimellitimide, or derivative thereof, in the presence of a Friedel Crafts catalyst, such as boron trifluoride. The trimellitimido alkyl substituted aromatic carbocyclic organic polymers can be electrodeposited onto various substrates to impart improved surface characteristics thereto.

The present invention relates to trimellitimido alkyl substituted aromatic carbocyclic polymers and to a method for making such materials. An alkyl trimellitimide or derivative thereof is employed with a Friedel Crafts catalyst, such as boron trifluoride in combination with an aromatic carbocyclic organic polymer.

Prior to the present invention, methods for coating a substrate with a polyimide have generally been based on the electrodeposition of a polyamide acid salt onto the substrate while it was employed as an electrode, or dip-coating the substrate into the polyamide acid. The conversion of the polyamide acid to the polyimide by heating generally resulted in the production of valuable insulating and protective coatings on the surface of the substrate. Although the aforementioned techniques involving the use of a polyamide acid or salt resulted in valuable polyimide films, the methods were generally limited to the use of polyamide acids which were the intercondensation product of reaction of organic dianhydrides and organic diamines.

A variety of polyimides were made available by the method of Klebe et al., copending application Ser. No. 846,623, filed July 1, 1969, and assigned to the same assignee as the present invention. Klebe et al. used an imido alkylating agent, such as maleimido methyl chloride and a boron trifluoride catalyst to introduce maleimido methyl substitution in an aromatic carbocyclic polymer such as polystyrene, polycarbonates, etc. Experience has shown that polyimides having maleimido substitution, rather than amide acid salt substitution, cannot be electrocoated or dip-coated. As a result a wide variety of aromatic carbocylic polymers such as polyarylene oxides, polycarbonates, polystyrene, etc. could not be electrodeposited or dip coated onto a metallic substrate.

The present invention is based on the discovery that a wide variety of aromatic carbocyclic organic polymers can be electrodeposited onto various metallic substrates by substituting certain trimellitic imido alkyl compounds, as imido alkylating agents in place of the imido alkylating agents used by Klebe et al. The trimellitic imido alkylating agents can be made from trimellitic imide as shown in componding application Ser. No. 177,099, filed concurrently herewith and assigned to the same assignee as the present invention.

There is provided by the present invention aromatic carbocyclic organic polymers having chemically combined trimellitic imido alkyl radicals of the formula, (1) 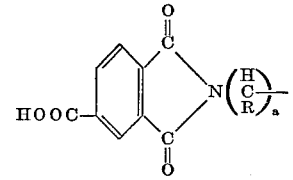

where R is selected from hydrogen and monovalent hydrocarbon radicals, and $a$ is an integer equal to 1 to 4 inclusive. The aromatic carbocyclic organic polymers which can be employed to make the subject polyimides of the present invention, can be either in the form of organic polymers having recurring aromatic carbocyclic radicals in the backbone, for example, polyarylene oxide, polycarbonates, derived from the employment of dihydric phenols, etc., or aromatic carbocyclic polymers in which the aromatic carbocyclic radical is in the pendant position, such as polystyrene or copolymers of styrene and butadiene such as polystyrene butadiene block copolymers, etc. The aromatic carbocyclic organic polymers having chemically combined radicals of Formula 1, referred to hereinafter as "polyimides," can be made by effecting reaction between an aromatic carbocyclic organic polymer and a trimellitic imido alkyl compound included by the formula, (2) 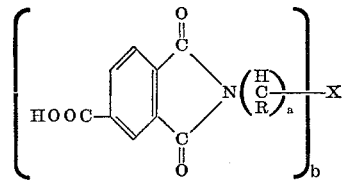

R and $a$ are as defined above, $b$ is an integer having a value of 1 or 2, and X is a radical selected from halogen, such as chloro, hydroxy, and oxygen, in the presence of a Friedel Crafts catalyst, such as boron trifluoride.

Included by the aromatic carbocyclic "backbone" polymers, are aromatic carbocyclic polymers having an average of from 5 to 500 recurring units of the formula, (3) 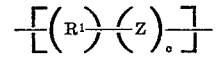

where $R^1$ is a polyvalent aromatic carbocyclic organo radical, Z is a polyvalent connective defined below, and $c$ is a whole number having a value of 0 or 1.

In addition to the aromatic carbocyclic backbone polymers of Formula 3, there also can be utilized in making the polyimides of the present invention, aromatic carbocyclic polymers with "pendant" aromatic carbocyclic radicals of the formula, and having an average of from 5 to 500 recurring units of the formula, (4) 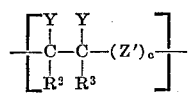

where $R^2$ is a monovalent aromatic carbocyclic radical, $R^3$ is selected from $R^2$ and Y radicals, Y is a member selected from hydrogen, lower alkyl, and halogen, and $Z'$ is a divalent organo connective defined below.

Polyvalent aromatic organic radicals included by $R^1$ are aromatic carbocyclic radicals having from 6 to 18 carbon atoms selected from hydrocarbon radicals and halogenated hydrocarbon radicals, such as for example, phenylene, chloronaphthylene, etc.; the aromatic carbocyclic polymers having radicals of Formula 3 also can consist of mixtures of units consisting of $R^1$ radical units mixed with units having polyvalent aliphatic radicals in place of R¹ radicals, for example, alkylene radicals having from 1 through 8 carbon atoms, where such mixture of units has at least 1 mole percent of R¹ radical units based on the total moles of R¹ radical units and polyvalent aliphatic radical units.

Pendant aromatic carbocyclic radicals included by R² are monovalent aromatic carbocyclic radicals having from 6 to 18 carbon atoms including hydrocarbon radicals and halogenated hydrocarbon radicals, for example, phenyl radicals, chloro phenyl radicals, bromo naphthyl radicals, chloro anthryl radicals, etc. Aromatic carbocyclic polymers having units of Formula 4 also can be associated with up to 99 mole percent of aliphatic units free of pendant monovalent aromatic carbocyclic radicals.

Polyvalent connectives included by Z of Formula 3 are for example,

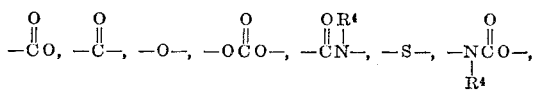

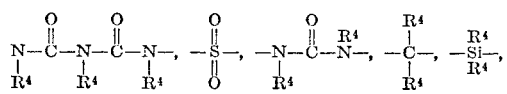

—C≡C—, etc., where R⁴ is selected from hydrogen, C(1–8) alkyl, and aryl radicals, such as phenyl, xylyl, etc.

Polyvalent connectives included by Z' of Formula 4 are for example,

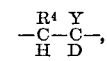

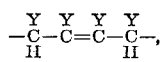

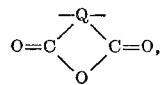

, etc., and mixtures thereof, where R' and Y are as previously defined, Q is a polyvalent aliphatic radical derived from aliphatically saturated monovalent hydrocarbon radicals and halogenated hydrocarbon radicals, and D is a monovalent radical selected from hydrogen, alkyl radicals, halogen radicals, aliphatic ester radicals, aromatic ester radicals, amido radicals, nitrile radicals, and aliphatic nitrile radicals.

Included by the aromatic carbocyclic polymers having chemically combined units of Formula 3, are for example, polyethers, polyesters, polycarbonates, polyamides, poly(amideimides), polysulfides, polyurethanes, polyimides, polybiurets, polyxylylene, polyarylacetylenes, polyphenylenes, polyarylsulfides, etc. Among the aromatic organic polymers having chemically combined units of Formula 4 are for example, polystyrene, poly-(α-methyl styrene), poly(methyl-α-methyl styrene), poly(dimethyl styrene), poly(chlorostyrene), poly(dichlorostyrene), styrene copolymers and terpolymers with butadiene, acrylonitrile, methyl methacrylate, vinylidene, chloride, maleic anhydride, vinyl chloride, vinyl acetate, α-methyl styrene, etc.

In addition, there also can be employed aromatic carbocyclic polymers which can include random, block or graft copolymers containing at least 10 mole percent of units of Formulas 3 or 4, chemically combined with up to 90 mole percent or less of units free of aromatic carbocyclic radicals, for example, there can be employed/ polystyrene-polybutadiene graft copolymers, etc.

Included by the trimellitic imido akyl compounds of Formula 2, are for example, N-hydroxymethyltrimellitimide, trimellitimidomethyl ether, N-chloromethyltrimellitimide etc.

The polyimides of the present invention can be made by effecting reaction between the trimellitic imido alkyl compound of Formula 2 and the aromatic carbocyclic organic polymer in the presence of a Friedel Crafts catalyst, such as boron trifluoride, aluminum chloride, stannic chloride, ferric chloride, zinc chloride concentrated sulfuric acid, toluene sulfonic acid, etc.

Temperatures which can be employed can vary over a range of from 0° C. to 200° C. and preferably from 20° to 150° C. The alkylation of the aromatic organic polymer can be effected in the presence of a suitable inert organic solvent. Any organic solvent can be employed which is inert to the reactants under the conditions of the reaction and which facilitates contact between the aromatic organic polymer and the imido-alkylene compound. Suitable organic solvents include, for example, methylene chloride, chloroform, tetrachloroethane, chlorobenzene, carbondisulfide, nitromethane, nitrobenzene, and other solvents with electronegative substituents or mixtures of such solvents. Reaction can be effected between the imidoalkylene compound of the aromatic organic polymer in the presence of an effective amount of the Friedel-Crafts catalyst which can be employed over wide ranges of concentration. An effective amount is that amount of catalyst which provides for the production of imide substituted organic polymer at satisfactory yields. Experience has shown that effective results can be achieved if the catalyst concentration is employed at at least 1 mole percent, based on the total moles of imidoalkylene compound and chemically-combined aromatic organic units of Formulas 3 or 4 in the reaction mixture preferably from about 5 mole percent to 100 mole percent. Higher or lower amounts can be utilized without adversely affecting the results desired but special techniques or procedures may be required.

Reaction times will vary depending upon such factors as the temperature employed, degree of agitation, the type of imido-alkylene compound employed, the nature of the aromatic organic polymer, as well as the degree of imido-substitution desired in the final product. A period of from 1 hour or less, to as many as 48 hours or more will, therefore, not be unusual and under most circumstances effective results can be achieved, in about 2 hours to provide for at least about 5 mole percent of imido-substitution, based on the total moles of chemically-combined aromatic organic units in the polymer.

Experience has shown that during the alkylation of the aromatic organic polymer, substantially anhydrous conditions should be maintained to provide for optimum results. However, up to 1,000 parts of water per million parts of mixture can be tolerated. Recovery of the polyimide can be achieved by the use of a low molecular weight aliphatic alcohol into which a mixture can be poured to provide the separation of the final product. The polyimide can then be recovered by filtration, followed by standard drying techniques.

The polyimides of the present invention can be employed as insulating coatings and protective coatings on various metallic substrates, when electrodeposited from basic aqueous mixtures. Generally, the polyimide is dissolved in an organic solvent such as N-methyl pyrrolidone, dimethyl formamide, etc., in combination with water to produce an electrocoating mixture having from about 1% to 10% by weight of solids.

In order that those skilled in the art will be better able to practice the invention, the following examples are given by way of illustration and not by way of limitation. All parts are by weight.

EXAMPLE 1

There was added 1.74 part of N-hydroxy methyl trimellitimide to a solution of 10 parts of a commercially available bisphenol A polycarbonate in about 250 parts of chloroform. The intrinsic viscosity of the polycarbonate in chloroform at 25° C. was about 0.5 dl./g. Boron trifluoride was passed into the mixture for 4 hours at reflux temperature. A polymeric product was recovered when the resulting mixture was poured into excess methanol. Based on method of preparation and titration of carboxyl groups, there was obtained a polycarbonate having about 11 mole percent of its bisphenol radicals substituted with trimellitimido methyl radicals. The polymer contained 0.60% N by weight as determined by elemental analysis.

A solution of the above polyimide in N-methyl pyrrolidone was diluted with water, resulting in a mixture of 2.5% by weight of polymer, 48.7% of NMP and 48.8% of water. The polyimide was neutralized with 1 normal ammonium hydroxide solution. The polymer was deposited on a 2 in.$^2$ copper electrode using a 10 ma. current for 2 minutes. The electrode was dried at 125° C., for 1 minute and at 250° C. for 5 minutes in order to remove all solvents. The electrode was found to have a tough, flexible, electrical insulating coating amounting to 0.031 g. of deposited polymer.

EXAMPLE 2

A solution of 14 parts of HH–880 polystyrene in about 300 parts of chloroform was mixed with 6 parts of N-hydroxymethyltrimellitimide. A slow stream of boron trifluoride was introduced into the solution at reflux temperature over 6 hours. A product was then recovered by precipitation by pouring the mixture into excess methanol. Based on method of preparation, the product was a polystyrene having about 7.5 mole percent of chemically combined styryl radicals substituted with trimellitimido methyl radicals. A nitrogen analysis showing 0.88% N further confirmed its identity.

A solution containing 5% of the trimellitimido methyl substituted polystyrene in a mixture of 40% water and 60% N-methyl pyrrolidone is neutralized with ammonium hydroxide solution and electrodeposited on aluminum as described in Example 1. A well-adhering protective polymer coating is formed on the metal after drying at 200° C.

EXAMPLE 3

A solution of 1 part of N-hydroxy methyl trimellitimide and 10 parts of a polyester having 10 mole percent of isophthalyl units, 40 mole percent of adipyl, and 50 mole percent of ethylene glycol units in 70 parts of tetrachloro ethane and 30 parts of nitrobenzene is saturated with boron trifluoride and agitated at room temperature for 12 hours. The polymer is then recovered by pouring the mixture into excess methanol. Based on method of preparation and elemental analysis, the product is a polyester having about 2 mole percent of chemically combined trimellitimido methyl isophthalyl units based on the total moles of units.

The trimellitimido methyl substituted polyester is electrodeposited on a copper electrode from an ammonium hydroxide neutralized solution containing 1% solids in a mixture of 80% NMP and 20% water, using a procedure similar to the one described in Example 1. A flexible adherent coating of polyimide is obtained on the copper electrode after the electrodeposited polyester is dried at 125° C. for 1 minute and 250° C. for 5 minutes.

EXAMPLE 4

Boron trifluoride is passed into a solution of 10 parts of a poly(2,6-diphenyl phenylene oxide) having an intrinsic viscosity in chloroform of 0.75 dl./g. at 25° C., and 1 part of N-hydroxymethyl trimellitimide in a solvent mixture of 70 parts of chloroform and 30 parts of nitrobenzene. After the mixture has been saturated with boron trifluoride and agitated over a period of 12 hours at ambient temperature, the mixture is poured into excess methanol. A product is recovered in quantitative yield. Based on method of preparation, the product is a poly(2,6-diphenyl phenylene oxide) polymer having about 5 mole percent of chemically combined trimellitimido methyl substituted diphenyl phenylene oxide units. The carboxyl group content of the polymer is confirmed by base titration.

A solution of 2% of the above polyimide in N-methylpyrrolidone is diluted with 25% of water and neutralized with 1 normal ammonium hydroxide solution. The polymer is electrodeposited on a copper electrode as described in Example 1. A tough coating of uniform thickness and excellent thermal stability on the metal is obtained.

EXAMPLE 5

A solution is prepared consisting of 10 parts of a polysulfone, consisting essentially of phenylene ether radicals and sulfone radicals and 2 parts of N-hydroxy methyl trimellitimide in a solvent mixture consisting of 70 parts of tetrachloroethane and 30 parts of nitrobenzene. Boron trifluoride is passed into the mixture while it is agitated until the mixture is saturated with boron trifluoride. The mixture is agitated over a period of several hours and allowed to remain at ambient temperature. A product is recovered by pouring the mixture into methanol. Based on method of preparation, the colorless product which is recovered at a quantitative yield is a trimellitimido methyl substituted polysulfone having about 15 weight percent of trimellitimido methyl radicals based on the total weight of polymer.

A solution containing 2–4% of the above polyimide in a phenol-water mixture with about 75 volume percent of phenol, is treated with sufficient aqueous ammonium hydroxide solution to neutralize all carboxyl groups. The polymer is then electrodeposited anodically on a stainless steel electrode, resulting in a tough homogeneous film on the metal.

Although the above examples are limited to only a few of the very many variables within the scope of the present invention, it should be understood that the present invention is directed to a much broader class of aromatic carbocyclic polymers having chemically combined imido radicals of Formula 1 and methods for making such materials utilizing an imido alkyl compound included by Formula 2 in the presence of a Friedel-Crafts catalyst.

We claim:
1. An aromatic carbocyclic polymer having chemically combined trimellitic imidoalkyl radicals of the formula,

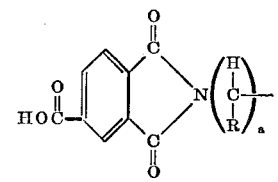

said aromatic carbocyclic polymer having an average of from 5 to 500 recurring chemically combined 2,6-di-substituted phenylene oxide units, where R is selected from the class consisting of hydrogen and monovalent hydrocarbon radicals, and $a$ is an integer equal to 1 to 4 inclusive.

2. An aromatic carbocyclic polymer in accordance with claim 1 consisting essentially of chemically combined 2,6-diphenyl-phenylene oxide units.

No references cited.

MELVIN GOLDSTEIN, Primary Examiner

U.S. Cl. X.R.

260—47 X, CZ, 49, 75 N, T, 77.5 A, 78 SC, 78.4 D